United States Patent
Xiong et al.

(10) Patent No.: US 8,792,389 B2
(45) Date of Patent: Jul. 29, 2014

(54) RAPID DEPLOYMENT DEVICES IN WIRELESS SELF-ORGANIZING NETWORKS AND METHODS FOR SAME

(75) Inventors: Jing Xiong, Shanghai (CN); Gang Qiang, Shanghai (CN); Yi Chen, Shanghai (CN)

(73) Assignees: Skyphy Networks Co., Ltd, Shanghai (CN); Skyphy Networks Communication(Shanghai), Shanghai (CN)

(*) Notice: Subject to any disclaimer, the term of this patent is extended or adjusted under 35 U.S.C. 154(b) by 99 days.

(21) Appl. No.: 13/385,757

(22) Filed: Mar. 6, 2012

(65) Prior Publication Data
US 2013/0064134 A1    Mar. 14, 2013

(30) Foreign Application Priority Data
Sep. 13, 2011   (CN) .......................... 2011 1 0269225
Sep. 13, 2011   (CN) ...................... 2011 2 0341668 U (51) Int. Cl.
*H04L 12/28*  (2006.01)
*H04W 40/12*  (2009.01)
*H04W 84/18*  (2009.01)

(52) U.S. Cl.
CPC ............. *H04W 40/12* (2013.01); *H04W 84/18* (2013.01)
USPC ........... 370/255; 370/248; 370/252; 370/254; 370/328

(58) Field of Classification Search
CPC ................. H04W 16/00; H04W 16/18–16/20; H04W 24/02–24/04; H04W 56/001–56/0025
USPC ......................... 370/248, 252, 254–255, 328; 455/422.1–425, 446; 709/223–224
See application file for complete search history.

(56) References Cited

U.S. PATENT DOCUMENTS

| | | | |
|---|---|---|---|
| 2007/0076640 A1* | 4/2007 | Bonta et al. ................... | 370/310 |
| 2008/0040509 A1* | 2/2008 | Werb et al. ..................... | 709/242 |
| 2010/0238890 A1* | 9/2010 | Mo et al. ........................ | 370/329 |
| 2011/0063999 A1* | 3/2011 | Erdmann et al. .............. | 370/254 |

* cited by examiner

*Primary Examiner* — Awet Haile
*Assistant Examiner* — Eric Myers
(74) *Attorney, Agent, or Firm* — Eastwind Consultants Co., Ltd.; Jenny Chen (57) ABSTRACT

The present invention provides rapid deployment devices in wireless self-organizing networks. The device in accordance with the present invention may include a control unit having a rapid deployment information segment module and a wireless communication unit electrically coupled to the control unit. The control unit of the present invention may broadcast a neighbor beacon to at least one neighbor. In accordance with the present invention, the rapid deployment information segment module may expand the neighbor beacon to include a rapid deployment information segment so as to transmit rapid deployment information. In accordance with the present invention, the rapid deployment information may include a cost sequence to a reference node.

16 Claims, 11 Drawing Sheets

Time 1            Time 2

Time 1        Time 2

RAPID DEPLOYMENT DEVICES IN WIRELESS SELF-ORGANIZING NETWORKS AND METHODS FOR SAME

CROSS-REFERENCE TO RELATED APPLICATIONS

This application is related to and claims priority to Chinese patent application, Chinese Application Number 201110269225.3, filed on Sep. 13, 2011, by the applicants Skyphy Networks Co., Ltd. and Skyphy Networks Communications (Shanghai), Inc., entitled "Rapid Deployment Devices in Wireless Self-organizing Networks and Methods for Same" and Chinese patent application, Chinese Application Number 201120341668.4, filed on Sep. 13, 2011, by the applicants Skyphy Networks Co., Ltd. and Skyphy Networks Communications (Shanghai), Inc., entitled "Rapid Deployment Devices in Wireless Self-organizing Networks."

FIELD OF THE INVENTION

The present invention generally relates to rapid deployment techniques in wireless networks; more particularly, the present invention relates to rapid deployment devices in wireless self-organizing networks and methods for same.

BACKGROUND OF THE INVENTION

Catastrophic events, such as earthquakes, wildfires and tsunamis, have occurred quite often in recent years. Conventional communication network stations could be out of service for several days or weeks due to these catastrophic events. Sometimes, complex terrains prevent satellite communication vehicles from reaching the sites where the network stations are and thus prolong the time it takes to recover the service. That is to say, the conventional communication and network organizing techniques can no longer satisfy the demand to timely respond to the catastrophic events. Wireless self-organizing networks have been deployed more frequently to cope with these natural disasters due to their independency, multiple hops, self-organizing, self-healing skills and mobility.

Figure 10:
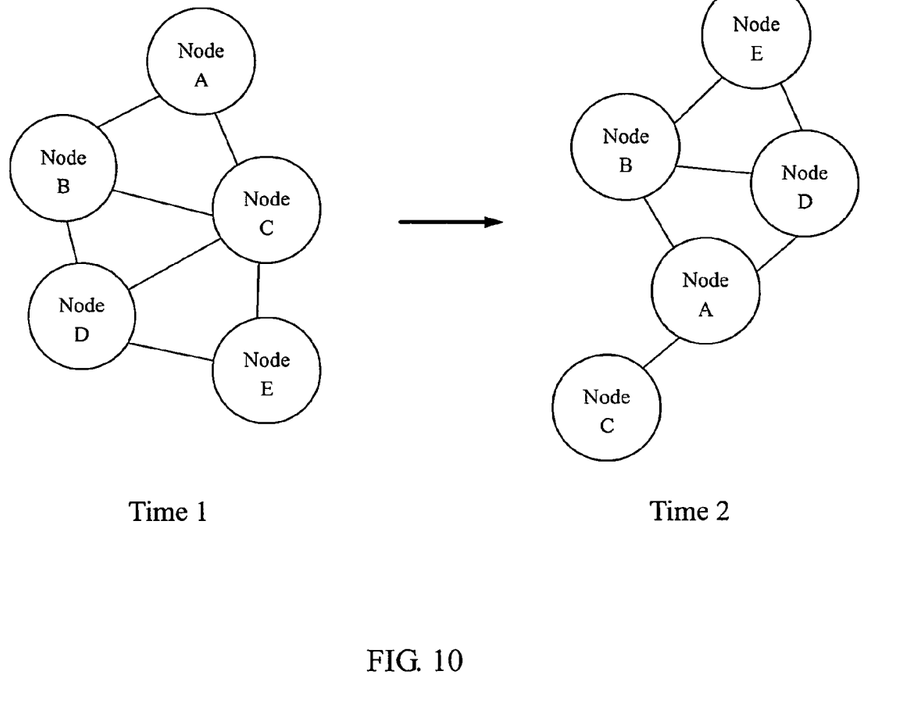
FIG. 10 illustrates a schematic diagram of a random position change of the nodes in a wireless self-organizing network in accordance with one embodiment of the present invention.
Figure 11:
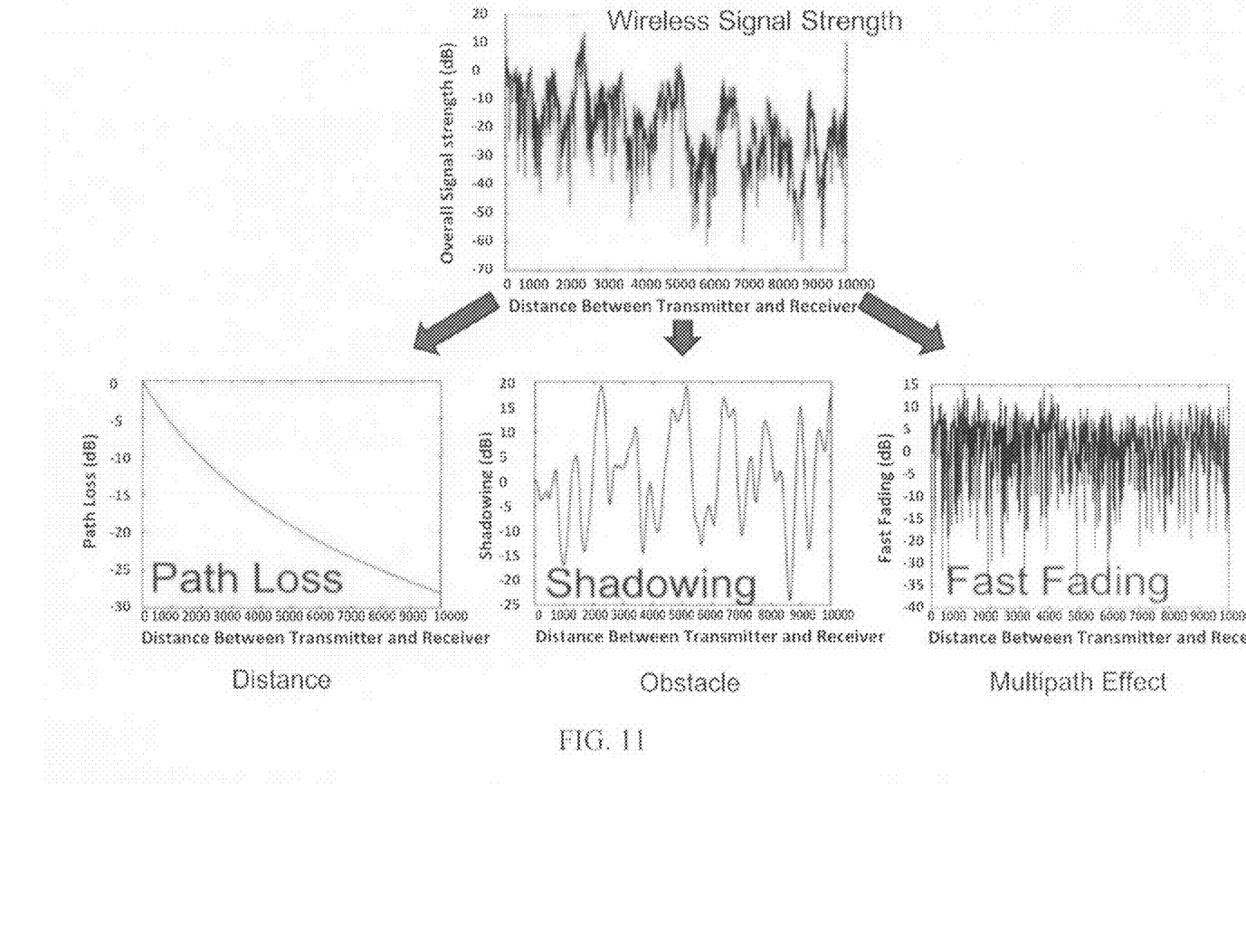
FIG. 11 illustrates a schematic diagram of an exemplary wireless signal in accordance with one embodiment of the present invention.

The topology of wireless self-organizing networks is constructed with multiple relays of wireless links so that the location of each node may change randomly, as shown in FIG. 10. The quality of wireless signals between nodes is thus affected by the location change of the nodes, wireless interference and territorial factors, as shown in FIG. 11.

In the conventional art, users of the wireless self-organizing networks, such as police officers and fire fighters, often lack sufficient wireless experience to deploy the nodes successfully. Sometimes, even if the network is successfully deployed, wireless communication may not work due to subsequent location change of the nodes. Thus, what is needed is a rapid deployment device and method in the wireless self-organizing network so as to timely respond to communication service outage caused by the catastrophic events.

SUMMARY OF THE INVENTION

In light of the drawbacks of the current art, the present invention provides a device transmitting a cost sequence of a best route from a self node to its reference node and quantifying the quality of the links of multiple relays between the self node and its reference node as well as the method thereof so as to provide a reliable and effective indication of the network connectivity. Additionally, the present invention may present the indication of network connectivity in multiple levels such that users can observe the connectivity status as they deploy the nodes. As a result, the users are able to determine whether a better communication quality can be established between their present location and their reference node, thereby achieving rapid deployment.

One aspect of the present invention is to provide a rapid deployment device in a wireless self-organizing network. In accordance with one embodiment of the present invention, the rapid deployment device may include a control unit. The control unit of the present invention may have a rapid deployment information segment setup module. The rapid deployment device may also include a wireless communication unit coupled to the control unit. The wireless communication unit of the present invention may broadcast a neighbor beacon to at least one neighbor node. In accordance with the present invention, the rapid deployment information segment setup module may expand the neighbor beacon to include a rapid deployment information segment to transmit rapid deployment information, and the rapid deployment information may include a cost sequence from a self-node to a reference node.

Another aspect of the present invention is to provide a rapid deployment method in a wireless self-organizing network. In accordance with the present invention, the rapid deployment method may include designating a reference node in a network; broadcasting a neighbor beacon of a self-node to at least one neighbor node; expanding the neighbor beacon to include a rapid deployment information segment; inserting a rapid deployment information in the rapid deployment information segment, wherein the rapid deployment information may include a cost sequence from the self-node to the reference node; and periodically updating the rapid deployment information of the self-node based on the rapid deployment information of the at least one neighbor node.

DETAILED DESCRIPTION OF THE INVENTION

Reference will now be made in detail to the embodiments of the present invention. Examples of embodiments are illustrated in the accompanying drawings, wherein like reference numbers refer to like elements throughout the specification.

In a preferred embodiment, the present invention may transmit a cost sequence of a best route between a self node and its reference node and quantify the quality of multiple relay links between the self node and its reference node so as to provide a reliable and effective connectivity indication. Additionally, the present invention may present the connectivity indication in multiple levels so that the users may observe the connectivity as they are deploying the nodes. As such, the users may determine whether a better communication quality may be established between the present location and the reference node, thereby achieving rapid deployment.

Figure 3:
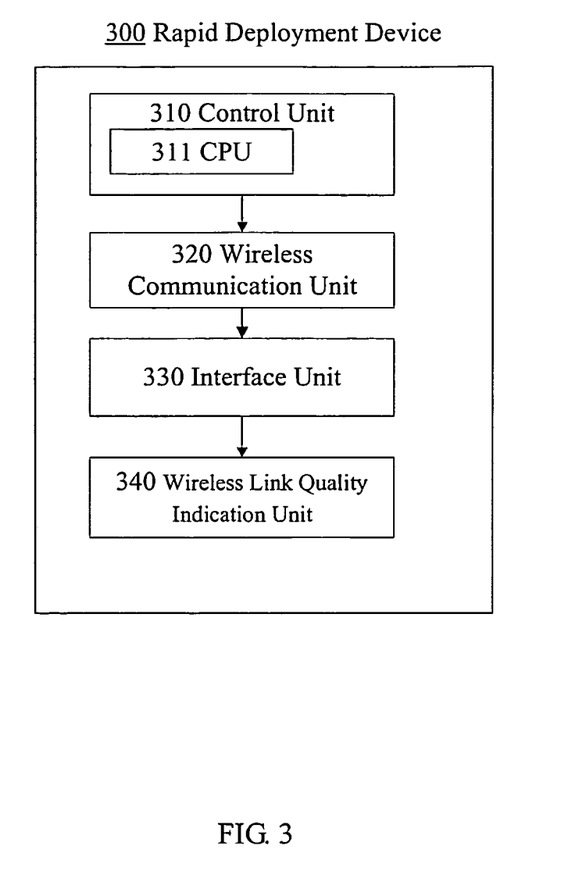
FIG. 3 illustrates a block diagram of an exemplary rapid deployment device in a wireless self-organizing network in accordance with one embodiment of the present invention.

Refer to FIG. 3, which illustrates a block diagram of an exemplary rapid deployment device in a wireless self-organizing network in accordance with one embodiment of the present invention. As shown in FIG. 3, the present device 300 may include a control unit 310 in accordance with one embodiment of the present invention. In this embodiment, the control unit 310 may include a central processing unit 311 provided on a main circuit board. In accordance with one embodiment of the present invention, the device 300 may also include a wireless communication unit 320 coupled to the control unit 310 by the main circuit board. In one embodiment of the present invention, the wireless communication unit 320 may be implemented by a wireless network card so as to receive and/or transmit wireless signals, such as broadcast a neighbor beacon.

In accordance with one embodiment of the present invention, the present device 300 may also include an interface unit 330 coupled to the control unit 310 on the main circuit board. In accordance with the present invention, the interface unit 330 may establish a network connection with an external device. For example, the interface unit 330 of the present invention may be implemented by a 10/100/1000M self-adaptive Ethernet port or other connection ports.

In accordance with one embodiment of the present invention, the present device 300 may also include a wireless link quality indication unit 340 coupled to the control unit 310 on the main circuit board. In accordance with the present invention, the wireless link quality indication unit 340 may be used to indicate the link quality of the wireless connection. For example, the wireless link quality indication unit 340 of the present invention may be implemented by a plurality of LEDs, LCD, or other device capable of showing the link quality indication.

Figure 1:
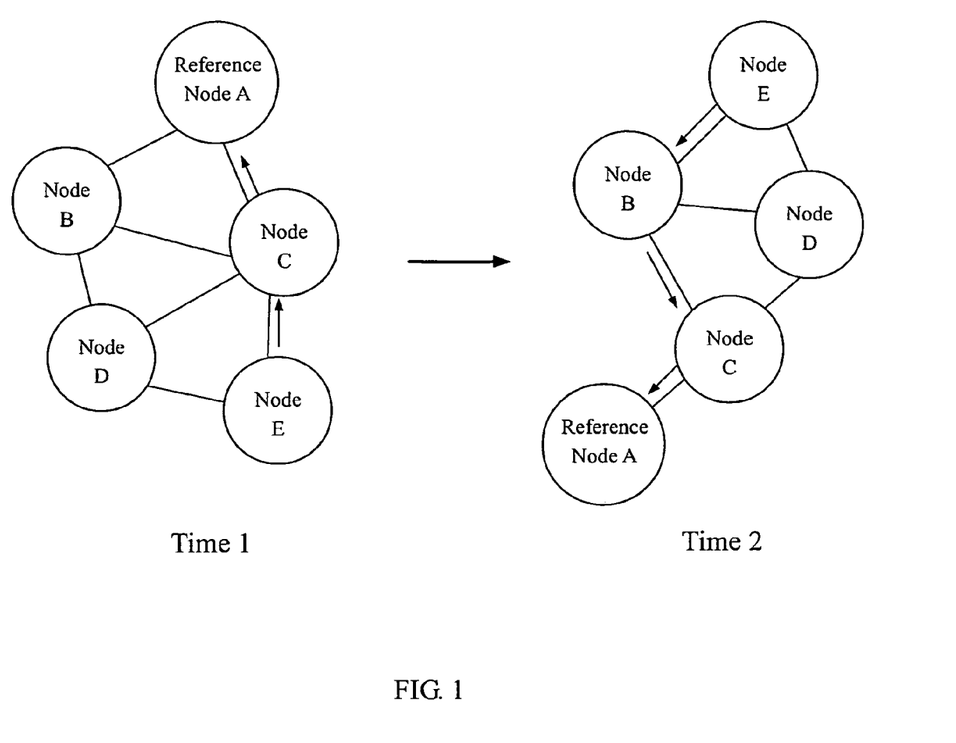
FIG. 1 illustrates a schematic diagram of an exemplary wireless self-organizing network in accordance with one embodiment of the present invention.
Figure 2:
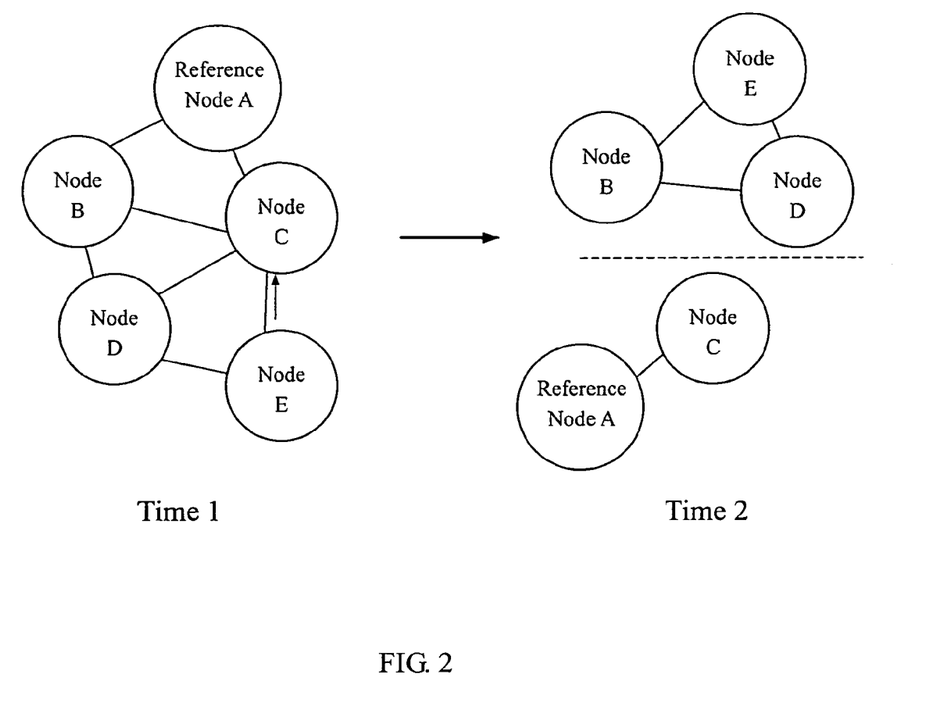
FIG. 2 illustrates a schematic diagram of an exemplary wireless self-organizing network in accordance with another embodiment of the present invention.
Figure 4:
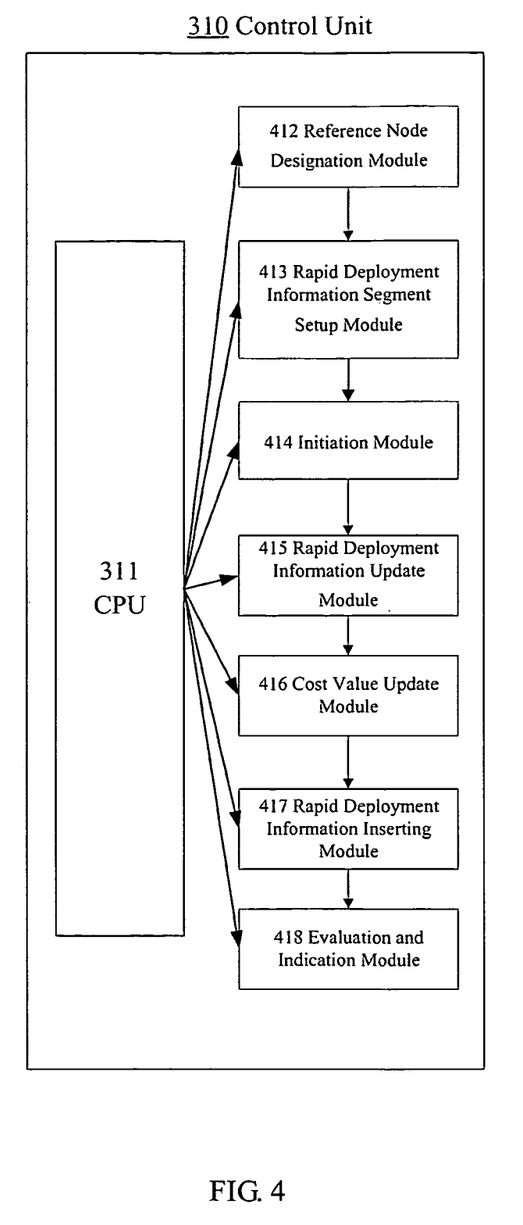
FIG. 4 illustrates a block diagram of an exemplary control unit in accordance with one embodiment of the present invention.

Refer to FIG. 4, which illustrates additional elements that may be included in the control unit 310 in accordance with one embodiment of the present invention. As shown in FIG. 4, the control unit 310 may further include a reference node designation module 412 in accordance with one embodiment of the present invention. The reference node designation module 412 of the present invention may be connected to the central processing unit 311. In accordance with the present invention, the reference node designation module 412 may designate a reference node in a network, such as reference node A in FIG. 1. In accordance with the present invention, during the node deployment in the wireless self-organizing network, each node may only need to pay attention to its connectivity to the reference node as soon as the reference node is designated by the reference node designation module 412. For example, in an emergency communication application, a reference node is usually the node closest to the command center. The reference node is a unique node in the network.

Normally, in the wireless self-organizing network, the node capable of performing direct communication with a self node is called a neighbor node. The relationship between nodes is maintained by periodically sending out a neighbor beacon. In other words, neighbors are the basis of the wireless self-organizing network. The present invention utilizes the neighbor beacon to transmit rapid deployment information.

In accordance with one embodiment of the present invention, the control unit 310 may include a rapid deployment information segment setup module 413. The rapid deployment information segment setup module 413 may expand a neighbor beacon of each node to include a rapid deployment information segment so as to transmit rapid deployment information. In accordance with one embodiment of the present invention, the rapid deployment information segment setup module 413 may be coupled to the central processing unit 311.

In accordance with one embodiment of the present invention, a cost value is defined as a time parameter used to transmit data from a transmitting node to a destination node. That is, the cost value reflects the bandwidth of the link. Each node may evaluate the cost value from itself to its neighbor node periodically. In other words, a neighbor list and the cost value to the neighbors on the list may be maintained by each node.

In accordance with one preferred embodiment of the present invention, a cost sequence is a sequence consisted of the cost value of each relay on a best route between the current node and the reference node. The present invention utilizes the neighbor beacon to transmit the cost sequence of a current node to the reference node so as to transmit the rapid deployment information. Transmitting the rapid deployment information with the neighbor beacon only increases a minimum amount of overhead because the neighbor beacon with the newly added rapid deployment information segment is slightly longer than the original neighbor beacon. However, no unnecessary routing overhead is generated. As such, the bandwidth used for data transmission is not occupied. Additionally, since the cycle for transmitting the neighbor beacon is usually shorter, the rapid deployment information can be transmitted in a timely fashion.

In accordance with one embodiment of the present invention, the rapid deployment information segment setup module 413 may expand an exemplary segment as follows to transmit the cost sequence of the self node to the reference node:

| Htd_total | Cost value | ... | Cost value |
| --- | --- | --- | --- |

In an emergency situation, a node needs to go through multiple relay links to get to the reference node. Because real time bandwidth testing is costly and less effective, the present invention adopts a rapid and effective method utilizing less network resources and node operation to perform overall bandwidth evaluation. To objectively present an evaluation result that is easy to understand, the present invention quantifies the cost sequence ($X_1, X_2, \ldots, X_n$) of the best route between the self node and the reference node with a multi-hop integral evaluation method to convert the sequence into a single data value ($X_\delta$).

Figure 5:
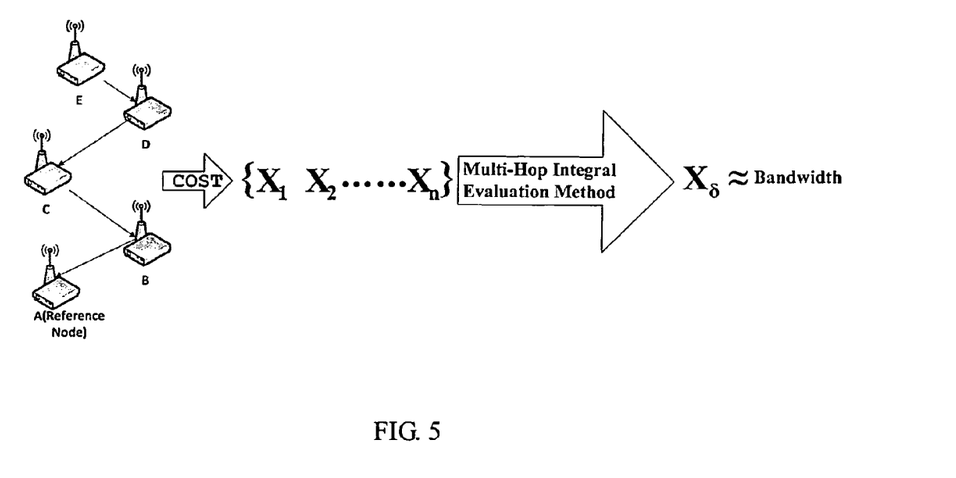
FIG. 5 illustrates an exemplary cost sequence adopted by a rapid deployment method in a wireless self-organizing network in accordance with one embodiment of the present invention.

Refer to FIG. 5, which illustrates a schematic view of the cost sequence of the best route between the self node and the reference node being quantified by the multi-hop integral evaluation method. In this example, node A is the reference node. The cost sequence from node E to node A is shown as $X_1$ indicating $Cost_{E-D}$, $X_2$ indicating $Cost_{D-C}$, $X_3$ indicating $Cost_{C-B}$, $X_4$ indicating $Cost_{B-A}$, as shown in FIG. 5. In accordance with one embodiment of the present invention, the cost value of each relay may be defined as a time parameter needed to transmit data from the transmitting node to the destination node. The time parameter may be based on a wireless status, network traffic, packet size, data transmission rate or any other parameters that may affect the transmission. However, those skilled in the art should understand that the cost value of the present invention is not limited to the time parameter needed to transmit data from the transmitting node to the destination node. Other parameters capable of representing the connectivity between two nodes may also be utilized in accordance with the present invention.

In accordance with the present invention, the wireless self-organizing network communication offers two features, namely buckets effect and two hops in half. Under the buckets effect, in a multiple-relay communication, if the cost value of any relay is extremely large, such as larger than 1024 or 2047, then it will greatly affect the overall bandwidth. Under two hops in half, the first two relays in the multiple-relay communication must be in half duplex, cutting the bandwidth in half.

Therefore, the present invention takes into the consideration of the two features above and creates a multi-hop integral evaluation method as follows:

If a value larger than or equal to Cmax (maximum cost value) exists in a cost sequence, then $X_\delta$ is infinity;

If all values in the cost sequence are smaller than Cmax, then the present invention calculates as follows:

The first two values in the cost sequence are added ($X_1 + X_2$), and included in $X_\delta$, the remaining values are averaged and included in $X_\delta$ along with a parameter (D) adjusting the positive deviation of X:

$$X_\delta = \begin{cases} \infty, & \exists X_i \geq C_{max}, \ i \in [1, n] \\ X_1 + X_2 + \overline{X_i} + D\sum \Delta X, & X_i < C_{max}, \ i \in [3, n] \end{cases}$$

$$\overline{X_i} = \frac{\sum_3^n X_i}{n-2}$$

$$\sum \Delta X = \sum_3^n X_i - \overline{X_i}, \ X_i > \overline{X_i}$$

Wherein $C_{max}$ and D may be adjusted depending on the current situation.

In accordance with one preferred embodiment of the present invention, to use the multi-hop integral evaluation method, each node must know the cost sequence of the best route between the self node and the reference node so as to obtain an evaluation result based on the method.

The present invention utilizes the neighbor beacon to transmit the cost sequence of the self-node to the reference node, as explained above. If the cost sequence is transmitted in the same way as data, then the bandwidth for data transmission will be greatly reduced. Additionally, the more real time the message is, the more bandwidth is occupied. Additionally, each node needs to maintain the route to the reference node, generating unnecessarily great overhead.

Return to FIG. 4. In accordance with one embodiment of the present invention, the control unit 310 may further include an initiation module 414 coupled to the central processing unit 311. In accordance with one embodiment of the present invention, the initiation module 414 may be used to initialize the rapid deployment information segment for each node.

For example, the initiation module 414 may initialize the htd_total (the number of relay) of the reference node to 0 and no cost value. As such, a non-reference node may identify the reference node through htd_total=0. On the other hand, the initiation module 414 may initialize htd_total of the non-reference node to 255 and no cost value to indicate that there's no route to the reference node.

Figure 6:
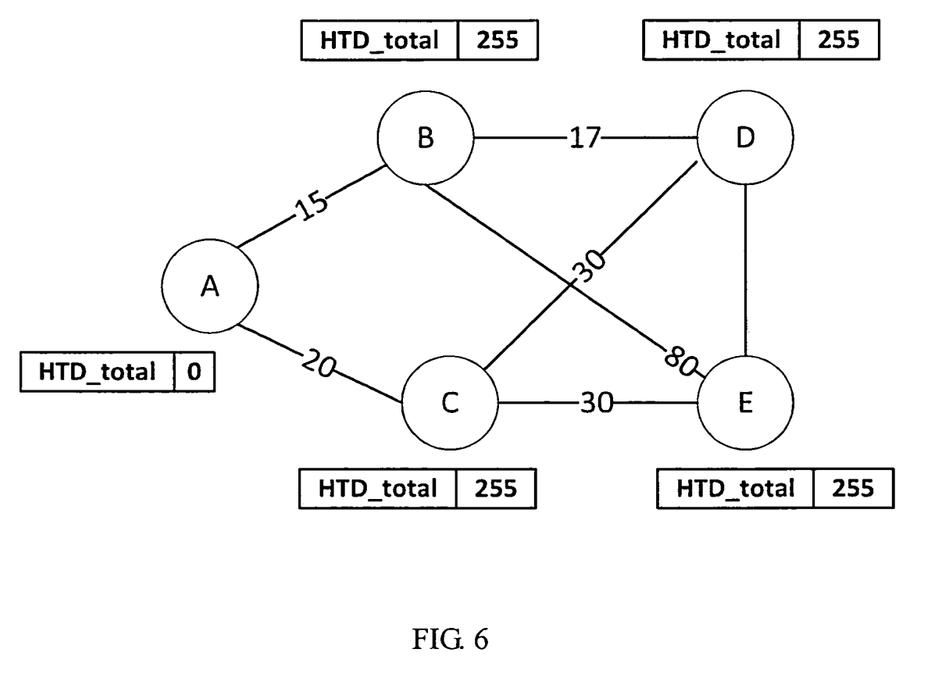
FIG. 6 illustrates a schematic diagram of the rapid deployment information at each node at an initialization stage in accordance with one embodiment of the present invention.

Refer to FIG. 6, which illustrates an exemplary initialization stage in accordance with one embodiment of the present invention, wherein the htd_total of reference node A is 0, and the htd_total of non-reference nodes, nodes B, C, D, E, is 255.

Return to FIG. 4. In accordance with one embodiment of the present invention, the control unit 310 may further include a rapid deployment information update module 415 coupled to the central processing unit 311. In accordance with the present invention, the rapid deployment information update module 415 may receive the neighbor beacon at each node and update the rapid deployment information of the neighbor node. In accordance with the present invention, each node will continue receiving the neighbor beacon sent by its neighbor node. Each node may also store the rapid deployment information included within the neighbor beacon so as to update its own rapid deployment information.

For example, at a given time point, node A has neighbor nodes B, C and D. Thus, node A may store the rapid deployment information of nodes B, C and D to the reference node, and continue updating such information, as shown in the below table:

|  | Htd_total | The cost sequence to the reference node |
|---|---|---|
| Neighbor B | 2 | (B1, B2) |
| Neighbor C | 3 | (C1, C2, C3) |
| Neighbor D | 4 | (D1, D2, D3, D4) |

In accordance with one embodiment of the present invention, the control unit 310 may further include a cost value update module 416 coupled to the central processing unit 311. In accordance with the present invention, the cost value update module 416 may be used to periodically update the cost value to the neighbor node. For example, at a give time point, node A may have neighbor nodes B, C, D, and thus node A may maintain a table such as one shown below:

|  | Cost(Cn) |
|---|---|
| Neighbor B | Cn(B) |
| Neighbor C | Cn(C) |
| Neighbor D | Cn(D) |

In accordance with one embodiment of the present invention, the cost value may be the time parameter needed to transmit data from the transmitting node to the neighbor node. However, those skilled in the art should know that other parameters may also be used as the cost value in accordance with the present invention.

In accordance with one embodiment of the present invention, the control unit 310 may further include a rapid deployment information inserting module 417 coupled to the central processing unit 311. In accordance with the present invention, the rapid deployment information inserting module 417 may be used to insert the latest rapid deployment information and send out the neighbor beacon. In accordance with one embodiment of the present invention, each node may periodically send out the neighbor beacon. Before the neighbor beacon is transmitted, information from the previous steps needs to be combined so as to be inserted into the rapid deployment information segment.

In accordance with one embodiment of the present invention, when the node transmits a neighbor beacon, it will check for relevant information in the neighbor list. If any of the neighbors has a htd_total=255 (the number of relay=255) in its rapid deployment information, then the neighbor is not within the scope of selection. It is assumed that the cost value from the present node to its neighbor is Cn, the cost sequence from to the reference node is (X1, X2, . . . , Xn).

$$Cn + \sum_{1}^{n} Xi$$

is calculated for each neighbor, wherein the neighbor with the smallest sum is called the best neighbor. In the neighbor beacon:

Htd_total=the best neighbor's htd_total+1

Cost sequence=the best neighbor's cost sequence+the cost value from the self node to the best neighbor (added to the front of the sequence).

As mentioned above, when node A transmits the neighbor beacon at this time, the htd_total in the rapid deployment information segment is htd_total=2+1=3 and the cost sequence is (Cn(B), B1, B2).

If the best neighbor's htd_total suddenly increases to 255, then it is marked that the self node cannot reach the reference node within a given time period, such as 1 second. After such period, the best neighbor is re-selected.

If the best neighbor's neighbor beacon is not received within a given time period, such as 1 second, then the above step is repeated.

Figure 7:
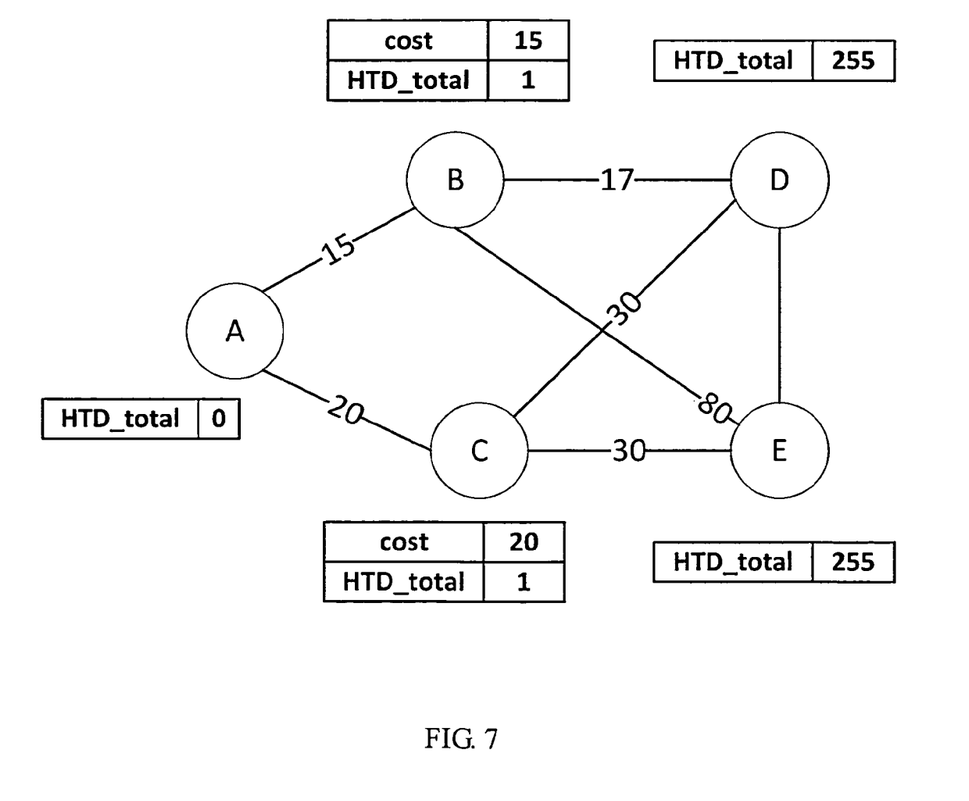
FIG. 7 illustrates a schematic diagram showing the node closest to the reference node obtaining a timely update first in accordance with one embodiment of the present invention.
Figure 8:
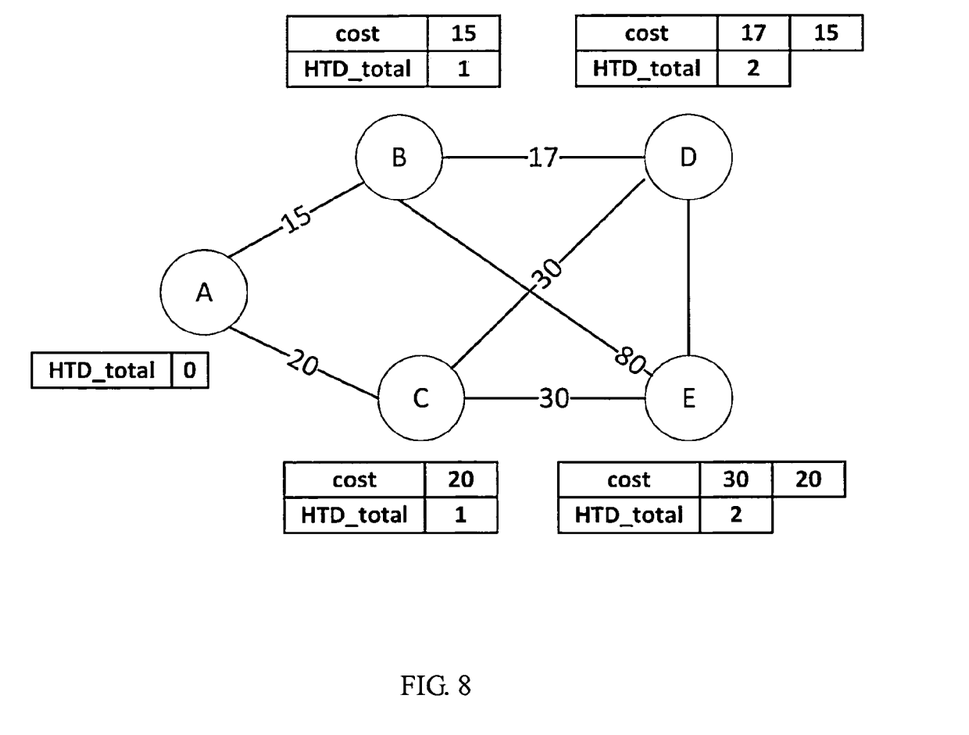
FIG. 8 illustrates a schematic diagram showing the node second closest to the reference node obtaining an update in accordance with one embodiment of the present invention.

Refer to FIGS. 7 and 8, which illustrate exemplary operations of the rapid deployment information inserting module 417 inserting the latest rapid deployment information in accordance with one embodiment of the present invention.

In this embodiment, it is assumed that 5 nodes are within the network, namely nodes A, B, C, D and E, wherein node A is the reference node. The straight line connecting two nodes indicates the two nodes can see each other, and the value above the straight line indicates the cost value between the two nodes.

FIG. 7 illustrates the reference node A's neighbor nodes B and C updating their respective neighbor beacon after receiving the reference node A's neighbor beacon in accordance with one embodiment of the present invention.

FIG. 8 illustrates the node second closest to the reference node updating their cost sequence. For node E, it can receive the neighbor beacons from nodes B and D. Through B, Cn=80 and $$\sum_{1}^{n} Xi = 15.$$

That is; the sum of the cost value from node E to the reference node A is 95. Through C, Cn=30 and $$\sum_{1}^{n} Xi = 20.$$

That is, the sum of the cost value from node E to the reference node A is 50. Therefore, node E selects node C's cost sequence to update its neighbor beacon. In accordance with the present invention, the steps above update data in a relatively small period, and thus reflect the most current network status.

Return back to FIG. 4. In accordance with one embodiment of the present invention, the control unit 310 may further include an evaluation and indication module 418, coupled to the central processing unit 311 and the wireless link quality indication unit 340. In accordance with the present invention, the evaluation and indication module 418 may evaluate the connectivity between a node and its reference node and indicate the status periodically. The evaluation and indication module 418 may further output the result through the wireless link quality indication unit 340 so that the user can directly see the result.

In one preferred embodiment of the present invention, each node may find out the best route to its reference node. In accordance with one preferred embodiment of the present invention, if a node finds out the best route exists; then the node will utilize a multi-hop integral evaluation method to quantify the connectivity between the self node and the reference node. That is the cost sequence is quantified into a data value to be shown to the user. For example, the present invention may show a multi-level indication through an LED provided on a panel of the node, such as the signal indicator provided on a mobile phone, or any other means understood by those ordinarily skilled in the art. For example, the present invention may utilize 4 LED indicators to represent 5 levels of indication.

In accordance with one preferred embodiment of the present invention, if a node cannot find the best route, that is, if the node determines the number of relay to the reference node is still the same as the initial value of 255, then the node determines that the best route does not exist. The node of the present invention may indicate that there is no route to the reference node.

Figure 9:
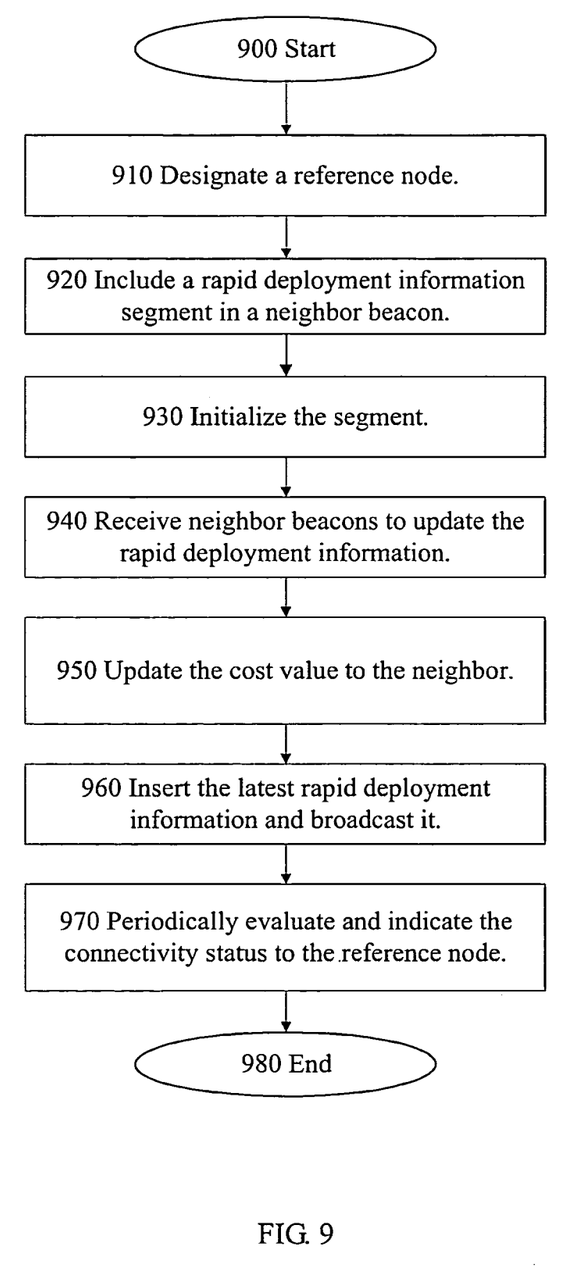
FIG. 9 illustrates a flow chart of an exemplary rapid deployment method in a wireless self-organizing network in accordance with one embodiment of the present invention.

Refer to FIG. 9, which illustrates a flow chart of a rapid information deployment method in a wireless self-organizing network in accordance with one embodiment of the present invention. As shown in FIG. 9, the present method starts at step 900. At step 910, the reference node designation module, such as the reference node designation module 412 in FIG. 4, designates a reference node, such as reference node A in FIG. 1. In accordance with one embodiment of the present invention, each node in the network periodically broadcasts its neighbor beacon to its neighbor nodes so as to inform them of the connectivity to the reference node.

Then, at step 920, the rapid deployment information segment setup module, such as the rapid deployment information segment setup module 413 in FIG. 4, expands the neighbor beacon to include a rapid deployment information segment.

In accordance with one embodiment of the present invention, the rapid deployment information segment can insert rapid deployment information including a cost sequence from the self node to the reference node. At step 930, the initiation module, such as the initiation module 414 in FIG. 4, initializes the rapid deployment information segment. As explained above, the initiation module 414 initializes the reference node's htd_total (number of relay) to 0 and no cost value so that non-reference nodes can identify the reference node through htd_total=0. On the other hand, the initiation module 414 can initialize the non-reference node's htd_total to 255 and no cost value to indicate that there's no route to the reference node.

Thereafter, at step 940, the rapid deployment information update module, such as the rapid deployment information update module 415 in FIG. 4, may continuously receive the neighbor beacon sent from its neighbors, store the rapid deployment information within the neighbor beacon, and update the self node's rapid deployment information. At step 950, the cost value update module, such as the cost value update module 416 in FIG. 4, updates the cost value from the self node to its neighbor. In one embodiment of the present invention, the cost value is the time parameter for data to be sent from a transmitting node to a neighbor node. Then, at step 960, the rapid deployment information inserting module, such as the rapid deployment information inserting module 417 in FIG. 4, inserts the latest rapid deployment information and transmits the neighbor beacon. As mentioned above, the reference node A's neighbors, nodes B and C, receives the neighbor beacon transmitted from the reference node A and update their own neighbor beacon. In one preferred embodiment of the present invention, the node second closest to the reference node will select the best neighbor's cost sequence to update its neighbor beacon.

Then, at step 970, the evaluation and indication module, such as the evaluation and indication module 418 in FIG. 4, periodically evaluates the connectivity to the reference node and indicates the result. In accordance with one embodiment of the present invention, periodically evaluating the connectivity to the reference node and indicating the result may include determining whether a best route to the reference node exists based on the number of relay to the reference node. If the best route exists, then the cost sequence is converted into a data value to be shown. If the best route does not exist, then it is shown that there is no route to the reference node. In one embodiment of the present invention, the best route may be deemed non-existent if the relay number to the reference node is 255. The wireless link quality indication unit 340 of the present invention may output the result and show it to the user. In accordance with one embodiment of the present invention, the data value is calculated based on a multi-hop integral calculation method, and the value data can be indicated in multiple levels, as explained earlier. The method ends at step 980.

In accordance with the present invention, the rapid deployment device in the wireless self-organizing network and the methods for same may effectively and rapidly deploy nodes, including quantitatively evaluating wireless links with multiple replays and quantifying information transmission between nodes so as to timely indicate the connectivity in the wireless self-organizing network to allow the user to perform rapid deployment. The present invention can provide precise indication and timely information with relatively low overhead costs.

While the invention has been described in conjunction with exemplary preferred embodiments, it is to be understood that many alternatives, modifications, and variations will be apparent to those skilled in the art in light of the foregoing description. Accordingly, the present invention embraces all such alternatives, modifications, and variations. All matters set forth herein or shown in the accompanying drawings are to be interpreted in an illustrative and non-limiting sense.

What is claimed is:

1. A rapid deployment method in a wireless self-organizing network, said method comprising:
   designating a reference node to a self-node already in said network;
   broadcasting a neighbor beacon of said self-node to at least one neighbor node in said network;
   expanding said neighbor beacon of said self-node to include a rapid deployment information segment;
   inserting rapid deployment information of said self-node in said rapid deployment information segment, wherein said rapid deployment information of said self-node includes a cost sequence from said self-node to said reference node;
   periodically updating said rapid deployment information of said self-node based on rapid deployment information of said at least one neighbor node, wherein said rapid deployment information of said at least one neighbor node includes a cost sequence from said at least one neighbor node to said reference node; and
   periodically performing evaluation and indication of a connectivity to said reference node,
   wherein periodically performing evaluation and indication of said connectivity to said reference node includes determining whether a best route exists based on a relay number to said reference node, when said best route exists, said cost sequence is converted to said data value to be indicated, and when said best route does not exist, no route to said reference node is indicated, and
   wherein said data value is calculated based on a multi-hop integral evaluation method, said multi-hop integral evaluation method is derived from the following equation:

$$X_\delta = \begin{cases} \infty, & \exists\, X_i \geq C_{max},\ i \in [1, n] \\ X_1 + X_2 + \overline{X}_i + D\sum \Delta X, & X_i < C_{max},\ i \in [3, n] \end{cases}$$

$$\overline{X}_i = \frac{\sum_{3}^{n} X_i}{n-2}$$

$$\sum \Delta X = \sum_{3}^{n} X_i - \overline{X}_i,\ X_i > \overline{X}_i$$

Wherein D is an adjustable parameter, X is a cost value, and $C_{max}$ is the maximum value of said cost value.

2. The method of claim 1, further comprising updating a cost value of said self-node to said at least one neighbor node.

3. The method of claim 1, further comprising outputting said data value, wherein said data value can be indicated in multiple levels.

4. The method of claim 1, wherein said reference node is a unique reference node.

5. The method of claim 1, wherein said cost sequence is a sequence consisted of a cost value of each relay on a best route from said self-node to said reference node, and wherein said cost value is a time parameter for a data to transmit from a transmitting node to a destination node.

6. The method of claim 1, further comprising initializing said rapid deployment information segment so as to set said relay number to said reference node to 0, said cost value to empty, and to set said relay number to a non-reference node to 255, said cost value to empty.

7. The method of claim 1, wherein updating said rapid deployment information includes continuously receiving said neighbor beacon sent from said neighbor node and storing said rapid deployment information included in said neighbor beacon.

8. The method of claim 1, wherein said best route is deemed non-existent when said relay number to said reference node is 255.

9. A rapid deployment method in a wireless self-organizing network, said method comprising:
- designating a reference node in a network;
- broadcasting a neighbor beacon of a self-node to at least one neighbor node;
- expanding said neighbor beacon to include a rapid deployment information segment;
- inserting rapid deployment information of said self-node in said rapid deployment information segment, wherein said rapid deployment information of said self-node includes a cost sequence from said self-node to said reference node;
- periodically updating said rapid deployment information of said self-node based on rapid deployment information of said at least one neighbor node, wherein said rapid deployment information includes a cost sequence from said at least one neighbor node to said reference node; and
- periodically performing evaluation and indication of a connectivity to said reference node, wherein periodically performing evaluation and indication of said connectivity to said reference node includes determining whether a best route exists based on a relay number to said reference node, when said best route exists, said cost sequence is converted to said data value to be indicated, and when said best route does not exist, no route to said reference node is indicated, and wherein said data value is calculated based on a multi-hop integral evaluation method, said multi-hop integral evaluation method is derived from the following equation:

$$X_\delta = \begin{cases} \infty, & \exists X_i \geq C_{max}, \ i \in [1, n] \\ X_1 + X_2 + \overline{X}_i + D\sum \Delta X, & X_i < C_{max}, \ i \in [3, n] \end{cases}$$

$$\overline{X}_i = \frac{\sum_{3}^{n} X_i}{n-2}$$

$$\sum \Delta X = \sum_{3}^{n} X_i - \overline{X}_i, \ X_i > \overline{X}_i$$

Wherein D is an adjustable parameter, X is a cost value, and $C_{max}$ is the maximum value of said cost value.

10. The method of claim 9, further comprising updating a cost value of said self-node to said at least one neighbor node.

11. The method of claim 9, further comprising outputting said data value, wherein said data value can be indicated in multiple levels.

12. The method of claim 9, wherein said reference node is a unique reference node.

13. The method of claim 9, wherein said cost sequence is a sequence consisted of a cost value of each relay on a best route from said self-node to said reference node, and wherein said cost value is a time parameter for a data to transmit from a transmitting node to a destination node.

14. The method of claim 9, further comprising initializing said rapid deployment information segment so as to set said relay number to said reference node to 0, said cost value to empty, and to set said relay number to a non-reference node to 255, said cost value to empty.

15. The method of claim 9, wherein updating said rapid deployment information includes continuously receiving said neighbor beacon sent from said neighbor node and storing said rapid deployment information included in said neighbor beacon.

16. The method of claim 9, wherein said best route is deemed non-existent when said relay number to said reference node is 255.

* * * * *